United States Patent [19]

Richeson

[11] Patent Number: 5,122,922
[45] Date of Patent: Jun. 16, 1992

[54] VARIABLE CAPACITIVE SENSOR ELEMENT

[75] Inventor: William E. Richeson, Fort Wayne, Ind.

[73] Assignee: North American Philips Corporation, New York, N.Y.

[21] Appl. No.: 588,253

[22] Filed: Sep. 26, 1990

[51] Int. Cl.$^5$ .................. H01G 5/28; H01G 5/04; G01F 23/26
[52] U.S. Cl. ........................ 361/284; 361/292; 361/298; 73/304 C
[58] Field of Search .......... 361/277, 278, 280, 284, 361/287, 292, 293, 296, 298

[56] References Cited

U.S. PATENT DOCUMENTS

| | | | |
|---|---|---|---|
| 1,337,549 | 4/1920 | Fitzgerald | 361/298 |
| 1,533,611 | 4/1925 | Respess | 361/298 |
| 2,913,645 | 11/1959 | Hansen et al. | 361/298 |
| 3,700,983 | 10/1972 | Goetzl | 361/298 |
| 4,184,369 | 1/1980 | Jung et al. | 73/304 C |
| 4,515,999 | 5/1985 | Harper | 200/5 A |
| 4,845,586 | 7/1989 | Blickstein | 361/292 |

Primary Examiner—Donald Griffin

[57] ABSTRACT

In a preferred embodiment, a capacitive sensor element which includes a metal plate which is flat and smooth and hard-coated with a dielectric material, such as an oxide. The dielectric surface slidingly contacts a smooth metal plate, such as hardened steel, with the capacitance of the sensor element varying with the area of contact of the two plates. Aluminum oxide provides an excellent dielecric surface. The sensor may be constructed in a number of configurations and can be ruggedly constructed for harsh environments. In a further embodiment, a metal member having a hard-coated dielectric material on the surface thereof is partially immersed in a conductive liquid to form a capacitive liquid level sensing element.

11 Claims, 1 Drawing Sheet

U.S. Patent    June 16, 1992    5,122,922
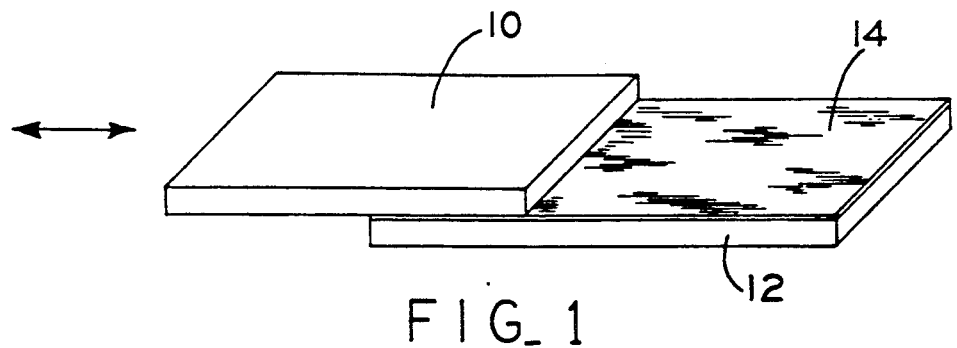
FIG. 1
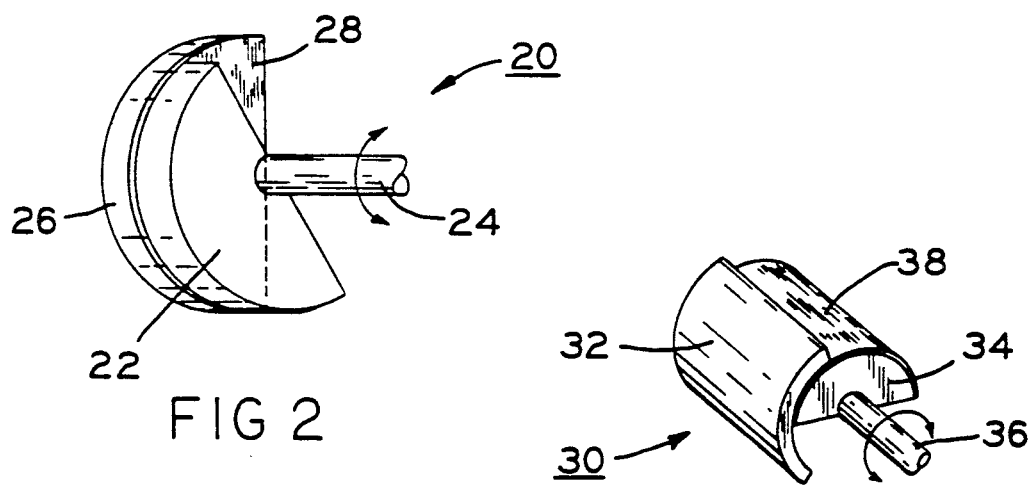
FIG. 2
FIG. 3
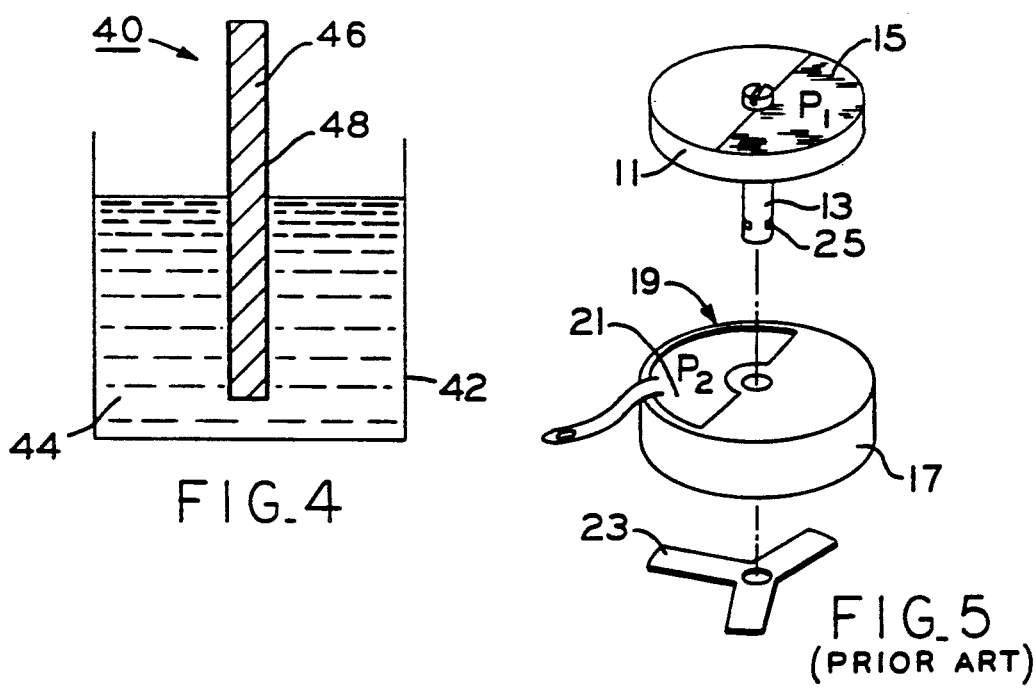
FIG. 4
FIG. 5
(PRIOR ART)

VARIABLE CAPACITIVE SENSOR ELEMENT

BACKGROUND OF THE INVENTION

1. Field of the Invention.

The present invention relates generally to capacitive sensors and, more particularly, to a capacitive sensor element in which the primary parts thereof are in direct contact, thus permitting construction of a rugged sensor that is particularly useful in harsh environments.

2. Background Art.

Capacitive sensors of the position sensing type typically comprise two, conductive, members disposed for relative movement therebetween separated by a dielectric material, with the relative position of the conductive members determining the capacitance of the sensor. In one particular field of application, that of automotive vehicles, such sensors can be useful, for example, as input devices for automatic leveling systems and throttle position input devices for electronic engine controls.

Conventionally, position sensors for such applications include potentiometers with sliding contacts and capacitive devices in which the dielectric material is air or a plastic. The former suffer the disadvantage that they are subject to corrosion and wear and cannot easily tolerate dirty environments. The latter suffer the disadvantage that, when the dielectric is air, the device is subject to erratic output, due to vibrations (causing the spacing to change), temperature changes, and dirty conditions.

In general, desirable characteristics of improved capacitive sensors elements include a large change in capacitance for a small change in position, a small loss factor, high electrical resistance, a high electrical breakdown strength, as well as special characteristics of the material to permit certain constructions which make possible ruggedized construction.

Accordingly, it is a principal object of the present invention to provide a capacitive sensor element which can be ruggedly constructed.

A further object of the invention is to provide such a sensor element which is relatively insensitive to temperature changes.

An additional object of the invention is to provide such a sensor element which is insensitive to vibration.

It is another object of the invention to provide such a sensor element which can be used in dirty environments.

Other objects of the present invention, as well as particular features and advantages thereof, will be elucidated in, or be apparent from, the following description and the accompanying drawing figures.

SUMMARY OF THE INVENTION

The present invention achieves the above objects, among others, by providing, in a preferred embodiment, a capacitive sensor element which includes a metal plate which is flat and smooth and hard-coated with a dielectric material, such as a metallic oxide. The dielectric surface slidingly contacts a smooth metal plate, such as hardened steel, with the capacitance of the sensor element varying with the area of contact of the two plates. Aluminum oxide provides an excellent dielectric surface. The sensor may be constructed in a number of configurations and can be ruggedly constructed for harsh environments. In a further embodiment, a metal member having a hard-coated dielectric material on the surface thereof is partially immersed in a conductive liquid to form a capacitive liquid level sensing element.

BRIEF DESCRIPTION OF THE DRAWING

Understanding of the present invention and the various aspects thereof will be facilitated by reference to the accompanying drawing figures, in which:

FIG. 1 is a perspective view of two contacting plates, illustrating the principle of the present invention.

FIG. 2 is a perspective view of one embodiment of the present invention, useful in a position sensor.

FIG. 3 is a perspective view of another embodiment of the present invention, useful in a position sensor.

FIG. 4 is a cross-sectional view of yet a further embodiment of the present invention, useful as a level sensor.

FIG. 5 is a trim capacitor which illustrates defects common to many prior art devices.

DETAILED DESCRIPTION OF THE PREFERRED EMBODIMENTS

Referring now to the Drawing, FIG. 1 illustrates the principal of the present invention. A first plate 10 is disposed for sliding, contacting engagement with a second plate 12 in the directions indicated by the two-headed arrow. Disposed as a surface coating on second plate 12 is a hard dielectric layer 14. First plate 10 is preferably a hard steel plate, while second plate is preferably 6061 aluminum with surface coating 14 of aluminum oxide, or alumina, with both plates being very flat. Surface coating 14 (as is true with similar coatings shown on other figures) is shown in exaggerated thickness for clarity. It will be understood that conventional electrical/electronic circuitry (not shown) would be connected between plates 10 and 12 to measure the capacitance therebetween and to complete the electrical portion of a position sensing device.

While a number of materials may be employed in practicing the present invention, the above are preferable because they have suitable properties and are relatively low cost. The following table shows a comparison of example materials having suitable characteristics for the construction of capacitive sensor elements according to the present invention. High voltage porcelain is included in the table primarily to furnish reference points for physical properties; although, porcelain makes a suitable dielectric material for use in the present invention. However, the necessary thickness of porcelain results in decreased sensitivity compared with sensor elements constructed with the other materials.

| | Substance | | | |
|---|---|---|---|---|
| | Alumina | High Voltage Porcelain | TiO$_2$ | BeO |
| Dielectric Constant | 9.6 | 6.5 | 8.5 | 6.9 |
| Temp. Coeff., ppm/degree C. | 125 | 200–600 | | |
| Breakdown | 300 | 200–400 | 150 | >300 |

-continued

| | Substance | | | |
|---|---|---|---|---|
| | Alumina | High Voltage Porcelain | TiO$_2$ | BeO |
| Voltage: Volts/mil | | | | |
| Dissipation Factor | 0.0006 | 0.008-.009 | 0.0006 | 0.0002 |
| Hardness | 2000 Knoop 9 Mohs | 300-500 Knoop | 8 Mohs | 9 Mohs |
| Volume Resistivity, Ohm-cm | $10^{14}$-$10^{15}$ | $10^{12}$-$10^{14}$ | $5 \times 10^{13}$-$5 \times 10^{14}$ | $10^{14}$ |

The use of aluminum oxide represents a good everyday approach because of its low cost and highly desirable properties. Tantalum oxide and beryllium oxide can be provided as electrolytic oxides. The invention is not, however, limited to coatings that are electrolytically applied and other coatings may be used where special needs of lubrication or environmental issues are of concern.

For comparison, hard steel has a hardness of 62.5 Rockwell C, or 740 Knoop, and silicon carbide has a hardness of 2500 Knoop.

Referring still to FIG. 1, surface coating 14 can be relatively thin, and when aluminum oxide is employed as the surface coating, it may be provided in a thickness of up to 3 mils and preferably is provided in a thickness of about 1.5-2 mils. Even thinner thicknesses may be employed where no allowance for abrasion needs to be made. Because of the thinness and high dielectric constant of surface coating 14, a capacitive sensor constructed according to the present invention will have high sensitivity in terms of change in capacitance per change in contacting areas.

Surface coating 14 may be formed or applied by any conventional means and may be formed or applied by techniques discussed in "The Challenge of Bonding Metals to Ceramics," by James Intrater, Machine Design, Nov. 23, 1989, page 95, which article is hereby made a part hereof by reference.

Whatever materials are selected, it will be appreciated that the capacitance between plates 10 and 12 will vary highly linearly as the plates are slid more or less in mutual contact. The hardness of plate 10 and surface coating 14 is such that mechanisms (not shown) can be provided to exert a great deal of force to urge contact of plate 10 with the surface coating. This permits construction of a capacitive sensor element which can withstand a high degree of vibration. Additionally, because of the nature of the materials, any such sensor may be used at high temperatures. Further, the sliding contact of first plate 10 with surface coating 14 inherently provides cleaning of the contacting surfaces by removing solid debris during the sliding contact; therefore, solid materials have no effect on the performance of such a sensor and the sensor may be employed in very dirty environments. Because there are no critical tolerances or adjustments, such a sensor is inherently a low cost device. Of course, the sensor is to a very high degree pressure insensitive.

If the product of the sliding velocity and the pressure of first plate 10 against surface coating 14 is high, a suitable lubricant may be provided between the contacting surfaces.

Due to the fact that the materials that may be employed in the present invention are readily formed into a variety of shapes, capacitive sensor elements of numerous configurations may be constructed. FIG. 2 depicts one such capacitive sensor element, generally indicated by the reference numeral 20. Capacitive sensor element 20 includes a movable first flat plate 22 of semicircular shape fixedly disposed on a rotatable shaft 24. A second, flat, semicircular plate 26, which may be assumed to be fixedly disposed with respect to the equipment (not shown) in which sensor element 20 is mounted, has on one face thereof a hard dielectric surface 28 which may be one of the materials discussed above and which is in contact with first plate 22. It may be assumed, for example, that shaft 24 is a portion of a throttle shaft in a vehicle. It can be seen that first and second plates 22 and 26 have congruent shapes and that, depending on the particular plate shapes, the capacitance between the plates will vary linearly or nonlinearly as shaft 24 is rotated. Otherwise, capacitive sensor element 20 has the same characteristics and advantages as the basic structure shown on FIG. 1.

This is in sharp contrast to the prior art device depicted in FIG. 5. The capacitor trimmer of FIG. 5 has a ceramic rotor 11 with an adjusting shaft 13 and a metalized coating 15 on the upper surface forming one conducting plate. The ceramic stator 17 has a depression 19 in which a metal insert or metalized surface 21 constituting the other plate is formed. The unit is assembled by a spring clip 23 which snaps into a notch 25 in the adjusting shaft 13. There is an air gap in depression 19 between the upper surface of plate 21 and the bottom side of ceramic rotor 11, hence the capacitor of FIG. 5 suffers from all the problems associated with air gap capacitors as discussed earlier. Moreover, the thickness of the ceramic rotor 11 as well as that of the air gap sum to form the separation between the plates 15 and 21. Since the capacitance of the capacitor is, among other things, inversely proportional to this separation, a relatively small maximum capacitance is all that can be achieved with this prior art design. In FIG. 2 with minimal plate separation, much larger maximum capacitances are achieved in comparable size units.

FIG. 3 depicts another form that a capacitive sensor element of the present invention may take, generally indicated by the reference numeral 30. Sensor element 30 includes a first plate 32 in the form of an arcuate shell, which may be assumed to be fixedly disposed with respect to the equipment (not shown) in which the sensor element is mounted. A second member 34, having a semicircular shape complementary to that of the inside of first plate 32, is fixedly disposed on a shaft 36 for relative contacting movement with the first plate. Disposed on the surface of second member 34 is a dielectric surface coating 38 having the properties described above.

While the embodiments of position sensing elements described with reference to FIGS. 1-3, above, have one particular part thereof which is moving relative to another part thereof, it will be understood that either the coated or uncoated part may move relative to the other.

FIG. 4 illustrates an embodiment of the present invention, a capacitive sensor element generally indicated by the reference numeral 40, used as a liquid level sensing element. Sensor element 40 is shown disposed in a vessel 42 of molten metal 44 or other electrically conductive liquid. Sensor element 40 includes a hollow or solid tube (solid shown) 46 having on the surface thereof a dielectric surface coating 48 having the properties described above. It will be understood that the capacitance between tube 46 and liquid 44 varies linearly as the height of the liquid and measurement of that capacitance will directly indicate the height of liquid 44 in vessel 42. Because of the favorable high temperature and corrosion resistance properties of the dielectric surface coatings described above, sensor element 40 may be employed in a variety of harsh environments.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense. As but two examples of variations within the scope of the present invention, the linear capacitor of FIG. 1 is structurally similar to the basic radio slide rule dial and either it or the rotary version of FIG. 2 could be easily adapted to high quality, compact, reliable, tuning capacitor applications.

It is also to be understood that the following claims are intended to cover all of the generic and specific features of the invention herein described and all statements of the scope of the invention which, as a matter of language, might be said to fall therebetween.

I claim:

1. A capacitive sensor element, comprising:
   (a) a first conductive member having disposed thereon a hard-coated dielectric surface coating comprising a metallic oxide;
   (b) a second conductive member disposed in direct contact with said first surface coating; and
   (c) said first and second conductive members being disposed for relative sliding contacting movement therebetween.

2. A capacitive sensor element, as defined in claim 1, wherein said surface coating is selected from the group consisting of aluminum oxide, titanium oxide, beryllium oxide, and tantalum oxide.

3. A capacitive sensor element, as defined in claim 1, wherein said first conductive element comprises aluminum.

4. A capacitive sensor element, as defined in claim 3, wherein said aluminum comprises 6061 aluminum.

5. A capacitive sensor element, as defined in claim 1, wherein said surface coating comprises aluminum oxide.

6. A capacitive sensor element, as defined in claim 5, wherein said aluminum oxide is on the order of up to 3 mils thick.

7. A capacitive sensor element, as defined in claim 5, wherein said aluminum oxide is on the order of about 1.5-2.0 mils thick.

8. A capacitive sensor element, as defined in claim 1, wherein said first and second conductive members comprise flat plates.

9. A capacitive sensor element, comprising:
   (a) a first conductive member having disposed thereon a hard-coated dielectric surface coating;
   (b) a second conductive member disposed in contact with said first surface coating;
   (c) a lubricant disposed between said surface coating and said second conductive member; and
   (c) said first and second conductive members being disposed for relative movement therebetween.

10. A capacitive sensor element, comprising:
    (a) a first conductive member having disposed thereon a hard-coated dielectric surface coating;
    (b) a second conductive member disposed in contact with said first surface coating; and
    (c) said first and second conductive members being disposed for relative movement therebetween;
    (d) one of said first and second conductive members comprises an arcuate metallic plate; and
    (e) the other of said first and second conductive members comprises a member having a surface shape complementary to the inside surface of said arcuate metallic plate.

11. A capacitive sensor element, comprising:
    (a) a first conductive member having disposed thereon a hard-coated dielectric surface coating;
    (b) a second conductive member comprising a liquid and disposed in contact with said first surface coating; and
    (c) said first and second conductive members being disposed for relative movement therebetween.

* * * * *